United States Patent
Yoneda

(10) Patent No.: US 7,511,455 B2
(45) Date of Patent: Mar. 31, 2009

(54) POWER SUPPLY UNIT HAVING UNIFORM BATTERY CHARACTERISTIC

(75) Inventor: Shogo Yoneda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 11/083,947

(22) Filed: Mar. 21, 2005

(65) Prior Publication Data

US 2005/0285563 A1    Dec. 29, 2005

(30) Foreign Application Priority Data

Jun. 23, 2004    (JP)    ............... 2004-184496

(51) Int. Cl.
*H02J 7/00*    (2006.01)

(52) U.S. Cl. .............. 320/112; 320/104; 320/107; 320/116; 320/150; 429/120

(58) Field of Classification Search ............... 320/104, 320/112, 116, 150, 107; 429/120
See application file for complete search history.

(56) References Cited

U.S. PATENT DOCUMENTS

| | | | | |
|---|---|---|---|---|
| 5,392,873 | A * | 2/1995 | Masuyama et al. | 180/68.5 |
| 5,859,523 | A * | 1/1999 | Nierescher et al. | 320/111 |
| 6,094,927 | A | 8/2000 | Anazawa et al. | |
| 6,344,728 | B1 * | 2/2002 | Kouzu et al. | 320/116 |
| 6,379,837 | B1 * | 4/2002 | Takahashi et al. | 429/151 |
| 6,586,132 | B1 * | 7/2003 | Fukuda et al. | 429/120 |
| 6,953,638 | B2 * | 10/2005 | Inui et al. | 429/120 |
| 6,967,464 | B2 * | 11/2005 | Heigl et al. | 320/107 |
| 7,150,935 | B2 * | 12/2006 | Hamada et al. | 429/71 |

(Continued)

FOREIGN PATENT DOCUMENTS

DE    102 52 810 A1    7/2003

(Continued)

OTHER PUBLICATIONS

Nissan Motor Co., Ltd., *Instruction Manual for New-Model Car (Supplement 1) Nissan Tino*, 2000, B-81-B-83. w/ partial translation.

*Primary Examiner*—Akm E Ullah
*Assistant Examiner*—Arun Williams
(74) *Attorney, Agent, or Firm*—Oliff & Berridge, PLC

(57) ABSTRACT

A component box has a shape of a substantially flat plate, and is stacked along a direction UPR toward the ceiling of a vehicle with its center placed at a central portion of a casing for a battery pack. Cooling wind which has been used for air-conditioning inside the vehicle and supplied from a cooling fan to the battery pack is supplied to a coolant introducing space located on an upper side of a module, passes through a gap between adjacent battery groups to flow down to a lower side of the battery groups, and then is emitted from a coolant lead-out space located at a lower side of the module out of the battery pack. Since the component box is in contact with a cooling wind passage with the casing therebetween, the component box in contact with the cooling wind via the casing is cooled down simultaneously with the cooling of the module. Since the component box is placed with its center positioned at the central portion of the battery pack, variations in temperature among batteries can be suppressed.

7 Claims, 8 Drawing Sheets

U.S. PATENT DOCUMENTS

| | | | |
|---|---|---|---|
| 7,297,438 B2* | 11/2007 | Kimoto | 429/120 |
| 2002/0012833 A1* | 1/2002 | Gow et al. | 429/120 |
| 2004/0058233 A1* | 3/2004 | Hamada et al. | 429/159 |
| 2004/0070366 A1* | 4/2004 | Takeshita et al. | 320/107 |
| 2006/0028167 A1* | 2/2006 | Czubay et al. | 320/104 |

FOREIGN PATENT DOCUMENTS

JP A 10-252467 9/1998

* cited by examiner

POWER SUPPLY UNIT HAVING UNIFORM BATTERY CHARACTERISTIC

This non-provisional application is based on Japanese Patent Application No. 2004-184496 filed with the Japan Patent Office on Jun. 23, 2004, the entire content of which is hereby incorporated by reference.

BACKGROUND OF THE INVENTION

1. Field of the Invention

The present invention relates to a power supply unit, and more particularly, to a power supply unit mounted in a vehicle having an electric motor as a drive source.

2. Description of the Background Art

Generally in a vehicle such as an electric vehicle (EV) or a hybrid vehicle (HV), driving force by electric energy is obtained by converting direct current (DC) electric power supplied from a high-voltage battery into three-phase alternating current (AC) electric power by an inverter and using the converted electric power to rotate a three-phase AC motor. In contrast, when the vehicle slows down, regenerative energy obtained by regenerative power generation in the three-phase AC motor is charged into the battery, and thus the vehicle runs without wasting energy.

Since a nickel metal hydride battery, a lithium ion battery or the like is mainly used as such a battery, reaction heat is generated by chemical reaction when the battery is charged, causing an increase in the temperature of the battery. The increase in the battery temperature results in deterioration of the performance and life of the battery. Therefore, means for cooling the battery is required to suppress the increase in the battery temperature.

For this reason, the vehicle is equipped with a cooling fan for cooling the battery. According to a battery temperature adjusting device mounted in an electric vehicle described in Japanese Patent Laying-Open No. 10-252467, a battery pack holding within a casing a battery assembly having a plurality of batteries is placed in a luggage space in a rear portion of the vehicle. Air which has been used for air conditioning of a cabin is introduced into the battery pack through an introducing passage to cool down or warm up the battery assembly. Further, the air which has been used for cooling down or warming up the battery assembly is exhausted out of the vehicle through an exhausting passage extending from the battery pack to the outside of the vehicle. With this structure, the air which has been used for the air conditioning of the cabin is used to cool down or warm up the batteries, improving heat utilization efficiency using waste heat.

Further, in addition to the high-voltage battery, the vehicle is equipped with an auxiliary battery supplying electric power to auxiliary electric components such as a lighting device, an ignition device, an electric pump, and the like. The auxiliary battery is charged with electric power generated by an alternator, or with electric power from the battery. In particular, when the auxiliary battery is charged with the electric power from the battery, the voltage is down-converted by a DC/DC converter.

It is common that the DC/DC converter connected to the battery, a battery electrical control unit (ECU) controlling charging/discharging of the battery, a sensor detecting the battery temperature, and the like are placed close to the battery pack to reduce wiring resistance between the battery and these components. As an example, these components are all accommodated into a casing and placed close to the battery pack as shown in FIG. 8. Hereinafter, a casing integrally accommodating a variety of circuit components connected to the battery will also be referred to as a "component box".

FIG. 8 is a perspective diagram of a vehicle equipped with a typical power supply unit.

Referring to FIG. 8, the power supply unit includes a battery pack 100 accommodating a battery group having a plurality of battery cells, and a component box 110 integrally accommodating a DC/DC converter, a battery ECU, a sensor, and the like connected to the battery group. It is to be noted that the direction indicated by an arrow UPR in FIG. 8 shows the direction toward the ceiling of the vehicle (upward direction), the direction indicated by an arrow FR shows the forward direction (moving direction) of the vehicle, the direction indicated by an arrow LH shows the direction toward the left side of the vehicle (left-side direction), and the direction indicated by an arrow RH shows the direction toward the right side of the vehicle (right-side direction).

Battery pack 100 has a shape for example of a rectangular box, and is placed on the floor of a luggage space 6 located behind a rear seat 5.

Component box 110 is placed adjacent to battery pack 100 in the direction indicated by arrow LH. Component box 110 and battery pack 100 are electrically connected with wiring (not shown). To ensure accommodating capacity of luggage space 6, battery pack 100 and component box 110 preferably have a small volume in total. Accordingly, in the case where battery pack 100 and component box 110 are placed in a line in the direction indicated by arrow LH as shown in FIG. 8, the volume of luggage space 6 can be ensured, and its accommodating capacity can also be enhanced by reclining rear seat 5 to spatially connect a cabin to luggage space 6.

It is to be noted that the DC/DC converter accommodated in component box 110 requires cooling because heat is generated by a power element. Thus, component box 110 further includes a cooling fan for cooling the DC/DC converter therein.

Recently, there has been a tendency that, to serve a need for higher-power vehicles, batteries have further been improved to have a higher voltage, resulting in an increase in the number of battery cells. The increase in the number of battery cells leads to an increase in the volume of battery pack 100 on a proportional basis.

When the tendency of higher-voltage batteries is applied to a conventional power supply unit, the increase in the volume of battery pack 100 is limited due to the limited volume of a portion in which the power supply unit can be mounted in the direction indicated by arrow LH in the vehicle, as shown in FIG. 8. Although dividing the battery group within battery pack 100 and separately placing the divided battery subgroups can be considered as one solution to attain a higher-voltage battery, the solution is not appropriate because it requires a space and cost for placing each of the divided battery subgroups.

Further, in the conventional power supply unit, component box 110 is placed adjacent to battery pack 100 in the direction indicated by arrow LH, as shown in FIG. 8. Accordingly, among the plurality of batteries constituting the battery group, a battery located on one side adjacent to component box 110 exchanges heat with component box 110 due to a difference in casing temperatures, and thus the battery comes to have a temperature different from that of a battery located on the other side. Consequently, variations in temperature are caused in the battery group in the direction indicated by arrow LH in FIG. 8, which may result in variations in characteristics and lives of the batteries.

SUMMARY OF THE INVENTION

One object of the present invention is to provide a power supply unit compactly accommodating components corresponding to a mounting limitation of a vehicle.

Another object of the present invention is to provide a power supply unit allowing a battery group to have a uniform characteristic.

According to an aspect of the present invention, a power supply unit mounted in a vehicle includes a battery pack accommodating a battery module having a plurality of battery cells, and a component box accommodating an electric component electrically connected to the battery module. The battery pack includes a casing as an exterior material for the battery module, and the component box is placed in contact with one of longitudinally extending side surfaces among a plurality of side surfaces of the casing.

Preferably, the component box has a shape of a substantially flat plate extending in a longitudinal direction of the casing.

Preferably, the component box has a shape of a substantially thin flat plate extending in the longitudinal direction of the casing.

Preferably, the component box is placed with its center positioned at a central portion of the longitudinally extending side surface of the casing.

Preferably, the longitudinal direction of the casing is substantially vertical to a forward direction of the vehicle, and the longitudinally extending side surface has a normal line in one of an upward direction, a downward direction, a forward direction, and a backward direction of the vehicle.

Preferably, the battery module is formed in the battery pack to include a plurality of layered battery groups each including the plurality of battery cells, and the component box is placed in contact with one of side surfaces extending in a direction in which the plurality of layered battery groups are layered among the plurality of side surfaces of the casing.

Preferably, the component box has a shape of a substantially flat plate extending in the direction in which the plurality of layered battery groups are layered.

Preferably, the component box has a shape of a substantially thin flat plate extending in the direction in which the plurality of layered battery groups are layered.

Preferably, the component box is placed with its center positioned at a central portion of the side surface of the casing extending in the direction in which the plurality of layered battery groups are layered.

Preferably, the direction in which the plurality of layered battery groups are layered is substantially vertical to a forward direction of the vehicle, and the side surface extending in the direction in which the plurality of layered battery groups are layered has a normal line in one of an upward direction, a downward direction, a forward direction, and a backward direction of the vehicle.

Preferably, the battery pack is placed in a luggage space behind a seat of the vehicle.

Preferably, the power supply unit further includes a cooling device for supplying a coolant to the battery module to cool down the battery module. The battery pack further includes a coolant passage through which the coolant passes between an outer surface of the battery module and the casing. The component box is placed in contact with the coolant passage via the casing.

Preferably, the battery pack further includes a coolant introducing space for supplying the coolant from the cooling device to the coolant passage, and a coolant lead-out space for exhausting the coolant from the coolant passage out of the battery pack.

Preferably, the cooling device includes an intake portion for taking in the coolant which has been used for air-conditioning of the vehicle, a blower portion for supplying the taken-in coolant to the battery pack, and an exhaust portion for exhausting the coolant exhausted from the battery pack out of the vehicle.

According to the present invention, a power supply unit compactly accommodating components corresponding to a mounting limitation of a vehicle can be structured, and a need for a higher-voltage battery can also be satisfied.

Further, since the component box is formed in the shape of a substantially flat plate and placed at the center of a side surface of the battery pack to extend along the direction in which the battery groups are layered, an increase in the volume of the entire power supply unit due to an increase in the volume of the batteries can be suppressed, and variations in characteristics and lives among battery cells can be reduced.

Furthermore, since the component box is placed in contact with the cooling wind passage in the battery pack to allow the battery pack and the component box to be cooled down simultaneously with a single cooling fan, the component box can be miniaturized and cooling efficiency of the cooling device can be improved.

Further, since the component box is formed in the shape of a substantially thin flat plate, a reduction in the volume of the luggage space due to the increase in the volume of the batteries can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
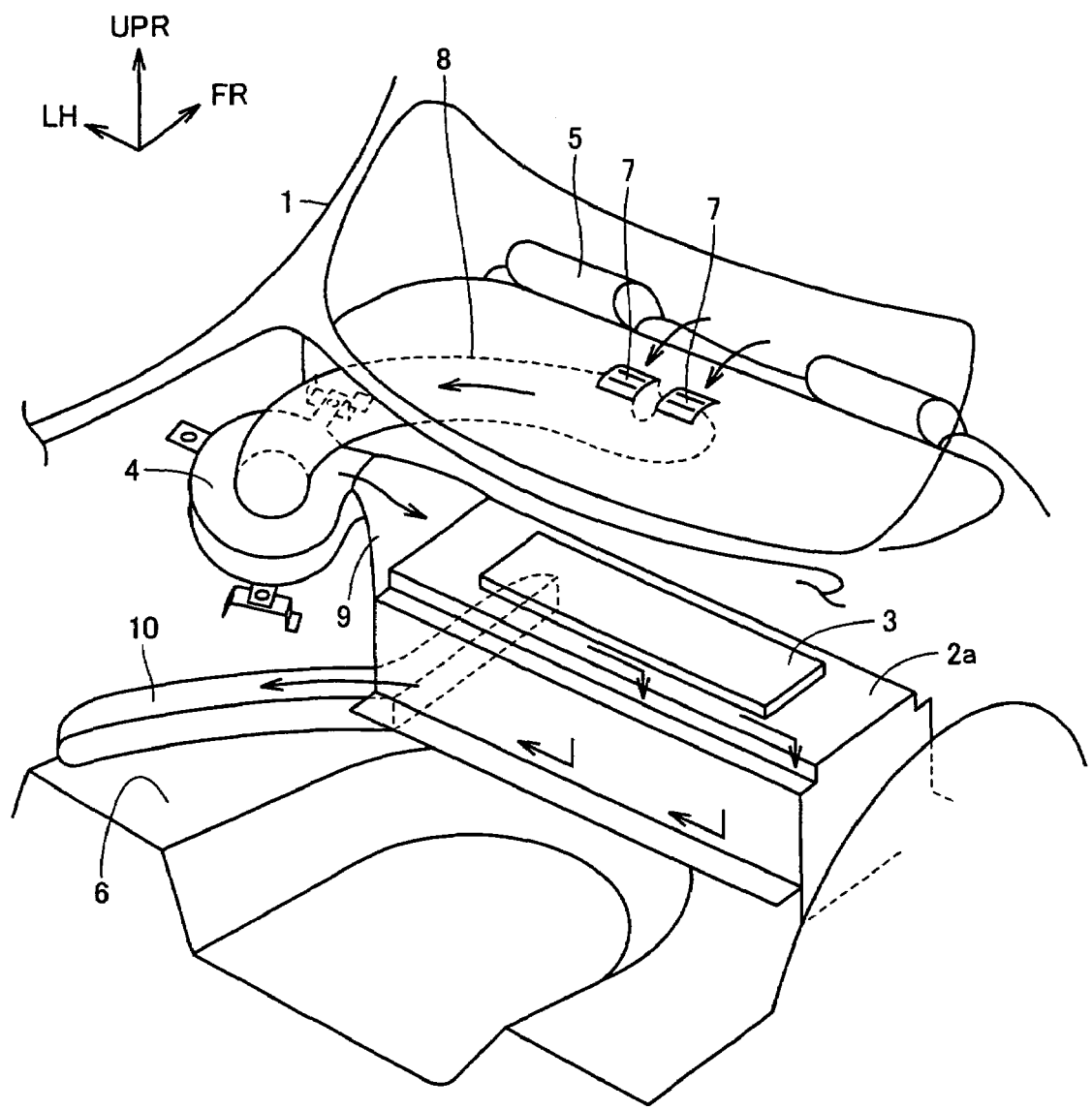
FIG. 1 is a perspective diagram of a vehicle equipped with a power supply unit in accordance with a first embodiment of the present invention.

Hereinafter, embodiments of the present invention will be described in detail with reference to the drawings, in which identical or corresponding parts will be designated by the same reference numerals.

First Embodiment

FIG. 1 is a perspective diagram of a vehicle equipped with a power supply unit in accordance with a first embodiment of the present invention.

Referring to FIG. 1, the power supply unit is placed on the floor of luggage space 6 located behind rear seat 5 of a vehicle 1. The power supply unit includes a battery pack 2a, a component box 3, and a cooling fan 4. It is to be noted that the direction indicated by arrow UPR in FIG. 1 shows the direction toward the ceiling of vehicle 1 (upward direction), the direction indicated by arrow FR shows the forward direction (moving direction) of vehicle 1, and the direction indicated by arrow LH shows the direction toward the left side of vehicle 1 (left-side direction).

Battery pack 2a has a structure accommodating a module as a battery set within a casing as an exterior material for battery pack 2a. The module is formed of a plurality of layered battery groups. Between the layered battery groups, a gap as a cooling wind passage is formed to allow cooling wind to pass therethrough. The structure of battery pack 2a will further be described in detail below.

Cooling fan 4 includes a rotation axis located therein, a plurality of blower fins located on the periphery of the rotation axis, and a motor connected to the rotation axis, all of which are not shown. Air within vehicle 1 taken from an intake port 7 is supplied to cooling fan 4 via an intake duct 8. In cooling fan 4, the motor (not shown) is rotated to rotate the rotation axis, and the cooling wind is supplied into battery pack 2a via a blower duct 9. On this occasion, the cooling wind passes through the gap between the layered battery groups as the cooling wind passage as indicated by the arrow in FIG. 1 to remove heat of each battery group. After cooling down the battery groups, the cooling wind flows from battery pack 2a to an exhaust duct 10, and is exhausted out of vehicle 1 from an exhaust port (not shown).

Component box 3 is placed adjacent to an upper surface of battery pack 2a. Component box 3 has a structure integrally accommodating a plurality of circuit components shown in FIG. 2 within the casing as an exterior material.

Figure 2:
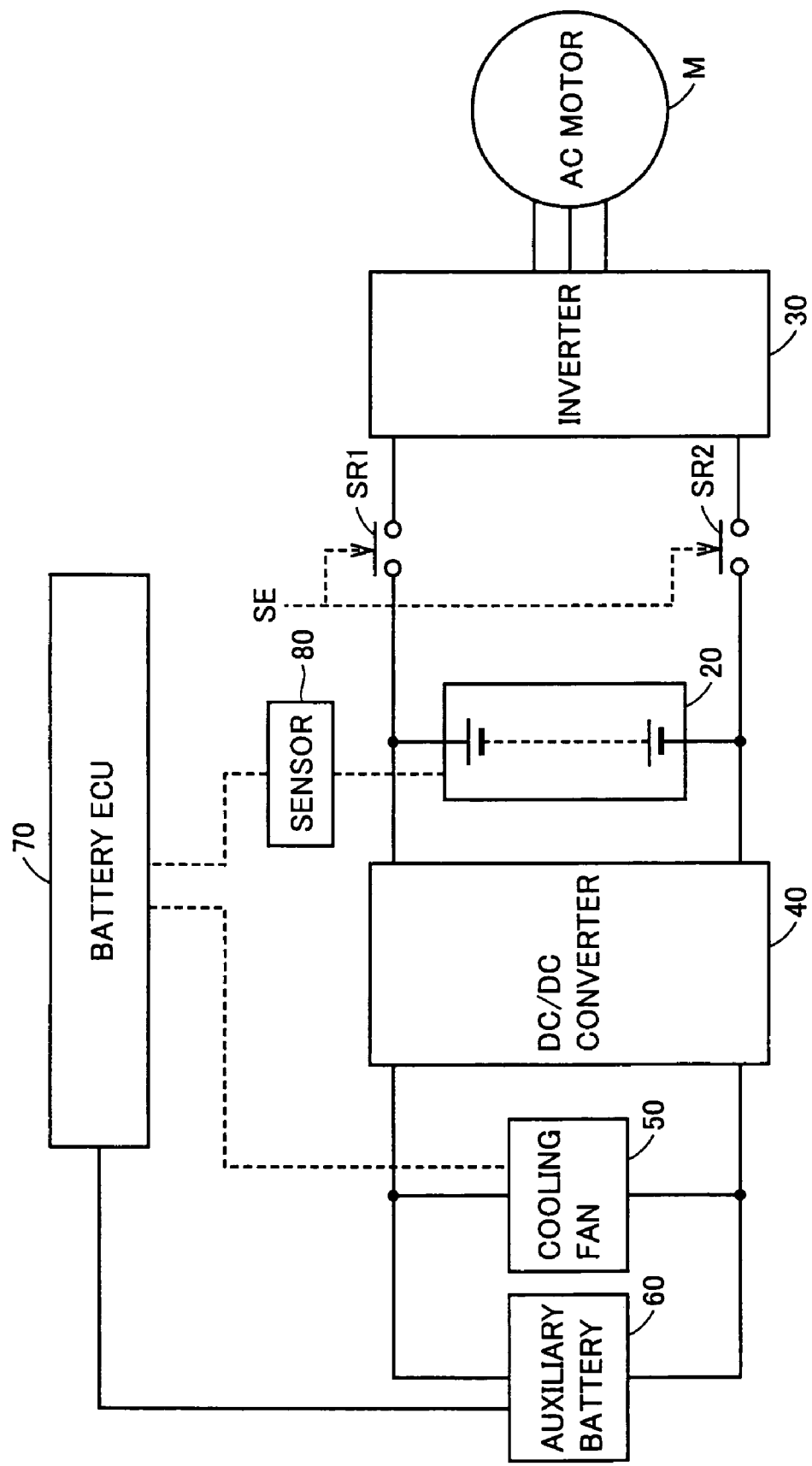
FIG. 2 is a functional block diagram of the power supply unit shown in FIG. 1.

FIG. 2 is a functional block diagram of the power supply unit shown in FIG. 1. Using this drawing, a specific structure of component box 3 shown in FIG. 1 will be described.

Referring to FIG. 2, the power supply unit includes a battery unit 20, an inverter 30 supplying electric power from battery unit 20 to an AC motor M, a DC/DC converter 40, a cooling fan unit 50, an auxiliary battery 60, a battery ECU 70 controlling charging/discharging of battery unit 20, a sensor 80, and system relays SR1 and SR2.

Figure 3:
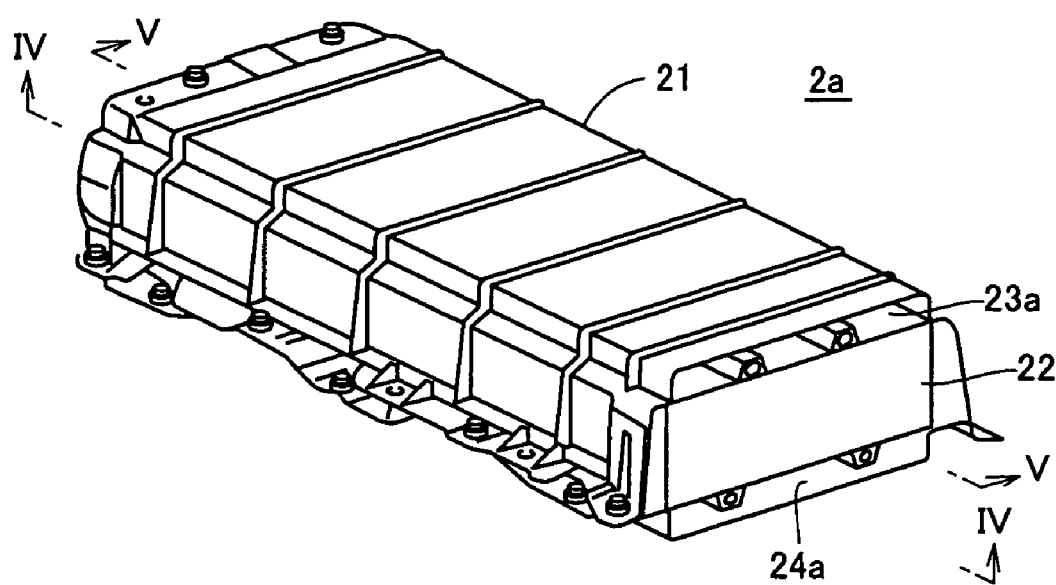
FIG. 3 is a view illustrating a structure of a battery pack shown in FIG. 1.

Battery unit 20 includes the module having the plurality of layered battery groups as previously described. The module is covered with the casing to form battery pack 2a as shown in FIG. 3. FIG. 3 is a view illustrating a structure of battery pack 2a shown in FIG. 1.

Referring to FIG. 3, battery pack 2a includes a casing 21 as an exterior material, and a module 22 accommodated within casing 21.

Although not shown, module 22 is formed of the plurality of layered battery groups. Between the layered battery groups, the gap as a cooling wind passage is formed. The battery group employs for example a nickel metal hydride battery, and has an external shape of a so-called rectangular flat plate.

The battery group includes a plurality of battery cells. Specifically, the battery group includes six battery cells placed within a one-piece case and separated by partition walls. The six battery cells basically have the same structure, and are electrically connected in series.

On a side surface of the battery group vertically extending with respect to a direction in which the battery groups are layered, a projection is formed to provide the cooling wind passage between the adjacent battery groups. In module 22 having the layered battery groups, the projections of the battery groups abut each other to form the gap between the battery groups.

Further, a space between an upper side surface of module 22 and casing 21 constitutes a coolant introducing space 23a for allowing the cooling wind supplied from cooling fan 4 to pass to the plurality of battery groups. Specifically, coolant introducing space 23a is coupled to blower duct 9 shown in FIG. 1.

On the other hand, a space between a lower side surface of module 22 and casing 21 constitutes a coolant lead-out space 24a for exhausting the cooling wind which has cooled down the battery groups out of battery pack 2a. Specifically, coolant lead-out space 24a is coupled to exhaust duct 10 shown in FIG. 1.

Referring back to FIG. 2, AC motor M is a drive motor for producing a torque for driving a drive wheel of a hybrid vehicle or an electric vehicle. In addition, AC motor M is a motor having a function of a generator driven by an engine as well as capable of serving as an electric motor for the engine to perform for example engine starting.

Inverter 30 is a three-phase inverter. When a DC voltage is supplied from battery unit 20, inverter 30 converts the DC voltage into a three-phase AC voltage according to a control signal from a control circuit (not shown) to drive AC motor M. Thus, AC motor M is driven to produce a designated torque.

DC/DC converter 40 down-converts the DC voltage from battery unit 20 to supply electric power to auxiliary battery 60 and auxiliary electric load such as a lighting device (not shown) or the like. The DC voltage supplied to auxiliary battery 60 charges auxiliary battery 60.

Cooling fan unit 50 has a structure shown in FIG. 1 and cools down battery unit 20. In the power supply unit in accordance with the present embodiment, cooling fan unit 50 is characterized in that it is placed to cool down battery-unit 20, and it also cools down an electric component other than battery unit 20 (for example, DC/DC converter 40) at the same time. A cooling structure of cooling fan unit 50 will be described in detail below.

Sensor 80 detects a battery temperature, a voltage across terminals, and a charging/discharging current value of battery unit 20. The various information detected by sensor 80 is transmitted to battery ECU 70.

Battery ECU 70 controls storage amounts of battery unit 20 and auxiliary battery 60, and also controls a blowing amount of cooling fan 4 in cooling fan unit 50 to adjust the battery temperature of battery unit 20.

System relays SR1 and SR2 are turned ON/OFF in response to a signal SE from the control circuit (not shown) to electrically connect/disconnect battery unit 20 to/from inverter 30.

In the power supply unit shown in FIG. 2, DC/DC converter 40, sensor 80 and battery ECU 70 are covered with the casing as one piece to form component box 3 shown in FIG. 1. It is to be noted that component box 3 may be formed to further include a circuit component other than these circuit components which is connected to battery unit 20.

In the above structure, the power supply unit in accordance with the present embodiment has its characteristic in the position in which component box 3 is placed.

Firstly, referring to FIGS. 1 and 2, component box 3 is characterized by being placed on the upper surface of casing 21 for battery pack 2a along direction UPR toward the ceiling of the vehicle. More specifically, component box 3 has a shape of a substantially flat plate, and is stacked in the direction indicated by arrow UPR with its center placed at the central portion of casing 21 for battery pack 2a. On this occasion, component box 3 is further characterized in that surfaces of casing 21 for battery pack 2a and of component box 3 facing each other are placed in contact with each other.

Secondly, component box 3 is characterized by having the shape of a substantially flat plate with a low height in direction UPR toward the ceiling of the vehicle, that is, a substantially thin flat plate.

These characteristics are clearly different from those of the conventional power supply unit in which component box 110 is placed adjacent to battery pack 100 in the direction indicated by arrow LH. According to these characteristics, the power supply unit in accordance with the present embodiment has the following effect in terms of system scale and cooling efficiency.

Figure 4:
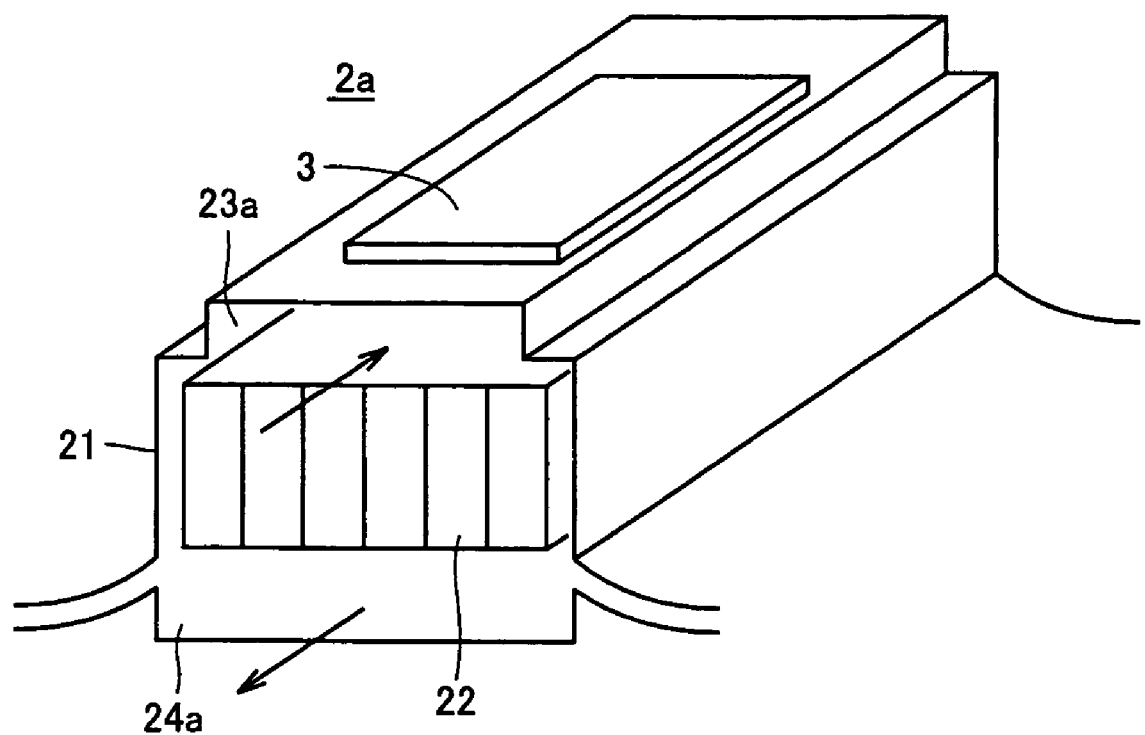
FIG. 4 is a diagram for describing a cooling structure of the power supply unit shown in FIG. 1.

FIG. 4 is a diagram for describing the cooling structure of the power supply unit shown in FIG. 1.

Referring to FIG. 4, the cooling wind supplied from cooling fan 4 to battery pack 2a as shown in FIG. 1 is provided to coolant introducing space 23a located on the upper side of module 22.

Next, the cooling wind passes through the gap between the adjacent battery groups of module 22 to flow down to the lower side of the battery groups. Accordingly, the battery groups are cooled down.

The cooling wind flowing down to the lower side of the battery groups is emitted from coolant lead-out space 24a located on the lower side of module 22 out of battery pack 2a. Coolant lead-out space 24a is connected to exhaust duct 10 shown in FIG. 1. When the cooling wind emitted from battery pack 2a flows into exhaust duct 10, it is exhausted from an exhaust port (not shown) out of vehicle 1.

In the cooling structure shown in FIG. 4, since component box 3 is placed in contact with the cooling wind passage (coolant introducing space 23a) with casing 21 therebetween as described above as the first characteristic, the cooling wind introduced into coolant introducing space 23a can cool down not only module 22 but also component box 3 which is in contact with the cooling wind via casing 21. Accordingly, a cooling fan for cooling a DC/DC converter mounted in component box 110 in the conventional power supply unit can be eliminated, reducing the number of components in component box 3 to achieve miniaturization.

Further, since the cooling fan for the DC/DC converter is eliminated, it becomes easy to form component box 3 in the shape of a substantially flat plate as shown in FIG. 3. In addition, the shape of a substantially flat plate can be achieved by arranging the circuit components included in component box 3, such as DC/DC converter 40, sensor 80 and battery ECU 70, to be spread in a plane in a longitudinal direction of battery pack 2a.

Figure 8:
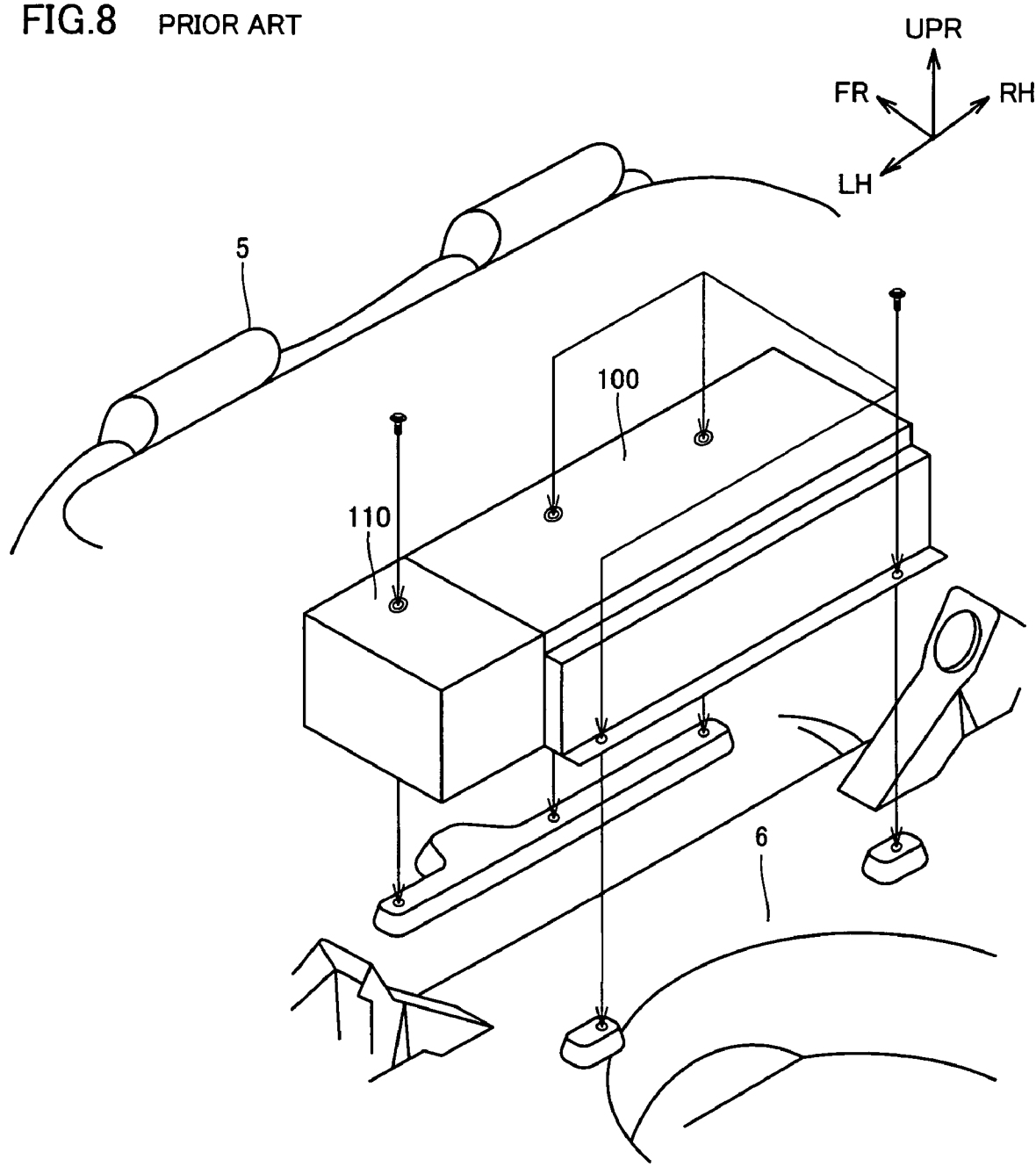
FIG. 8 is a perspective diagram of a vehicle equipped with a typical power supply unit.

Although component box 3 is placed on the upper surface of casing 21 for battery pack 2a in FIGS. 1 and 4, it is clear that the similar effect can also be obtained by placing it on the lower surface of casing 21. When component box 3 is placed on the lower surface of casing 21, the upper space of battery pack 2a is left, and thus rear seat 5 can be reclined to connect the cabin to luggage space 6 as in the conventional power supply unit in FIG. 8.

Further, since the power supply unit in accordance with the present embodiment is characterized in that component box 3 is placed with its center positioned at the central portion of battery pack 2a, heat exchange between component box 3 and battery pack 2a due to a difference in temperature is uniformly performed on the plurality of battery groups in module 22, suppressing variations in temperature among the batteries. Therefore, occurrence of variations in characteristics and lives of the batteries can be prevented.

Furthermore, in the cooling structure of FIG. 4, component box 3 is formed in the shape of a thin flat plate, which has been described as the second characteristic, and thus an increase in height in the upward direction of vehicle 1 resulting from stacking component box 3 on battery pack 2a can be suppressed. Therefore, rear seat 5 can be reclined backward to connect the cabin to luggage space 6 as in the conventional case, and accommodating capacity can be maintained even with a higher-voltage battery.

Forming component box 3 in the shape of a substantially thin flat plate can be implemented by eliminating the cooling fan for DC/DC converter 40, as described above. In addition, thin component box 3 can be formed when each of the circuit components such as system relays SR1 and SR2, battery ECU 70 and the like is formed in the shape of a thin flat plate and arranged in a plane. In particular, as for system relays SR1 and SR2 occupying a relatively large volume within component box 3, it is effective to change them from conventional electromagnetic relays to semiconductor relay switches in order to form thin component box 3.

Preferably, the contact surface between component box 3 and battery pack 2a has an area as large as possible, because the larger component box 3 has an area receiving the cooling wind via casing 21, the more cooling box 3 is cooled down efficiently, and the more the variations in temperature among the plurality of battery cells within battery pack 2a can further be reduced.

As described above, according to the first embodiment of the present invention, a power supply unit compactly accommodating components corresponding to a mounting limitation of a vehicle can be structured, and a need for a higher-voltage battery can also be satisfied.

Further, since the component box is formed in the shape of a substantially flat plate and placed at the center of a side surface of the battery pack to extend along a direction in which the battery groups are layered, an increase in the volume of the entire power supply unit due to an increase in the volume of the batteries can be suppressed, and variations in characteristics and lives among battery cells can be reduced.

Furthermore, since the component box is placed in contact with the cooling wind passage in the battery pack to allow the battery pack and the component box to be cooled down simultaneously with a single cooling fan, the component box can be miniaturized and formed thin, and cooling efficiency can be improved.

Second Embodiment

Figure 5:
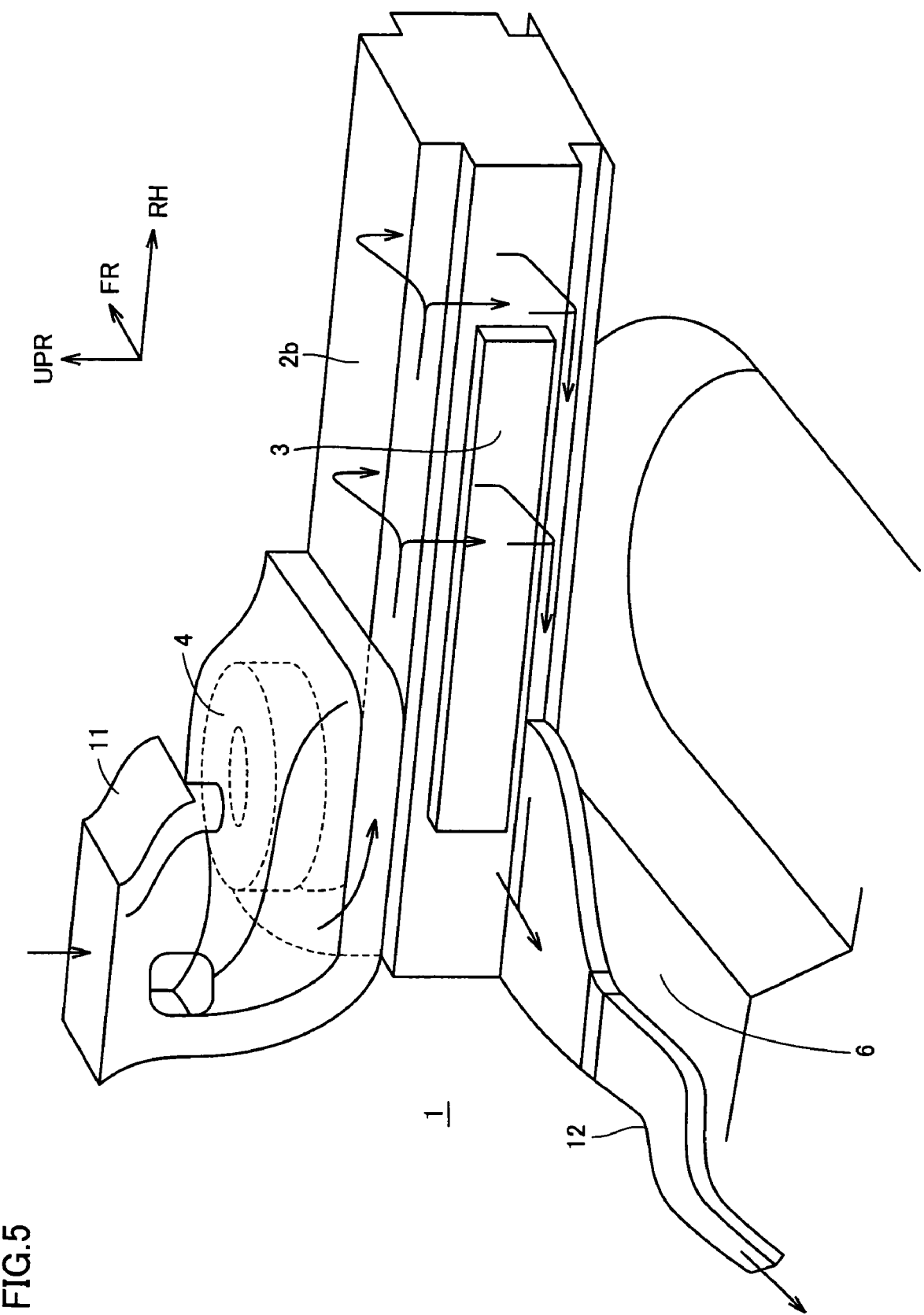
FIG. 5 is a perspective diagram of a vehicle equipped with a power supply unit in accordance with a second embodiment of the present invention.

FIG. 5 is a perspective diagram of a vehicle equipped with a power supply unit in accordance with a second embodiment of the present invention.

Referring to FIG. 5, the power supply unit is placed on the floor of luggage space 6 located behind rear seat 5, as in the first embodiment. The power supply unit includes a battery pack 2b, component box 3, and cooling fan 4.

Figure 6:
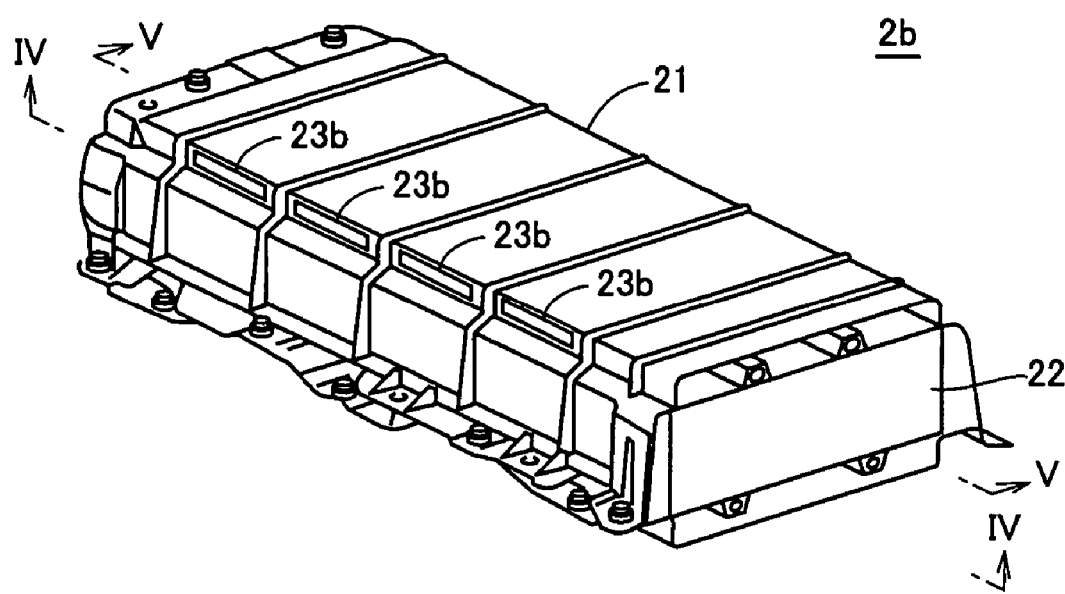
FIG. 6 is a view illustrating a structure of a battery pack shown in FIG. 5.

Battery pack 2b has a structure basically similar to that of battery pack 2a shown in FIG. 3. FIG. 6 is a view illustrating a structure of battery pack 2b shown in FIG. 5.

Referring to FIG. 6, battery pack 2b has a structure accommodating module 22 within casing 21 as an exterior material.

In module 22, a gap as a cooling wind passage is formed between layered battery groups to allow cooling wind to pass therethrough. The battery group employs for example a nickel metal hydride battery, and has an external shape of a so-called rectangular flat plate.

The battery group includes a plurality of battery cells. Specifically, the battery group includes six battery cells placed within a one-piece case and separated by partition walls. The six battery cells basically have the same structure, and are electrically connected in series.

Battery pack 2b further includes a plurality of ventilation holes 23b penetrating from casing 21 to the upper surface of module 22 along the direction in which the battery groups are layered. These ventilation holes 23b constitute a coolant introducing space for allowing the cooling wind from cooling fan 4 to flow into battery pack 2b.

Although not shown, battery pack 2b further includes a plurality of ventilation holes penetrating from the lower surface of module 22 to casing 21 along the direction in which the battery groups are layered. These ventilation holes constitute a coolant lead-out space for exhausting the cooling wind which has cooled down the battery groups out of battery pack 2b.

In this manner, battery pack 2b in accordance with the present embodiment is different from battery pack 2a in accordance with the first embodiment with regard to the positions in which the coolant introducing space and the coolant lead-out space are placed. Due to the difference in the structure of the battery pack, the power supply unit in accordance with the present embodiment employs a cooling structure which will be described below.

Referring back to FIG. 5, component box 3 is placed adjacent to a rear side surface of casing 21 for battery pack 2b located in the backward direction of vehicle 1. More specifically, component box 3 has a shape of a substantially flat plate, and is mounted on the rear surface of casing 21 for battery pack 2b with its center placed at the central portion of casing 21. On this occasion, surfaces of casing 21 for battery pack 2b and of component box 3 facing each other are placed in contact with each other. In addition, component box 3 is placed not to obstruct putting-in and taking-out of a spare tire (not shown) accommodated in luggage space 6.

Cooling fan 4 is placed on the left side of the upper surface of battery pack 2b. Above cooling fan 4 is provided an intake duct 11 for taking in the cooling wind which has been used for the air-conditioning inside vehicle 1. Below cooling fan 4 is provided an exhaust duct 12 for exhausting the cooling wind which has cooled down battery pack 2b out of the vehicle.

In the above structure, the cooling wind taken in by cooling fan 4 is supplied to module 22 via coolant introducing space 23b (not shown) in battery pack 2b, and then passes through the gap between the adjacent battery groups to cool down each battery group. The cooling wind which has cooled down the battery groups is emitted to exhaust duct 12 through the coolant lead-out space (not shown).

Figure 7:
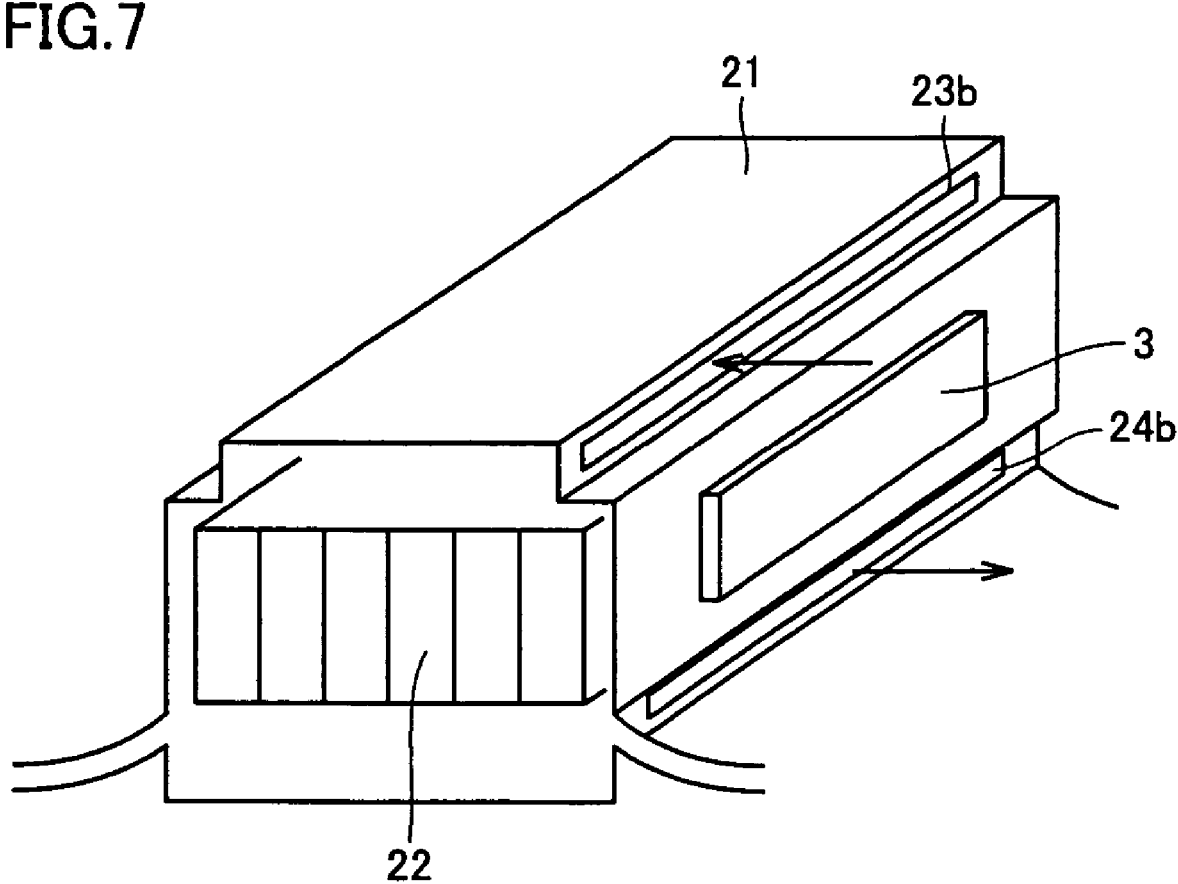
FIG. 7 is a diagram for describing a cooling structure of the power supply unit shown in FIG. 5.

FIG. 7 is a diagram for describing a cooling structure of the power supply unit shown in FIG. 5.

Referring to FIG. 7, the cooling wind supplied from cooling fan 4 to battery pack 2b as shown in FIG. 5 flows into coolant introducing space 23b located on the upper surface of battery pack 2b, via intake duct 11.

Next, the cooling wind passes through the gap between the adjacent battery groups in module 22 to flow down to the lower side of the battery groups. Accordingly, the battery groups are cooled down.

The cooling wind flowing down to the lower side of the battery groups is led out of battery pack 2b via coolant lead-out space 24b located on the lower surface of battery pack 2b. Coolant lead-out space 24b is connected to exhaust duct 12 shown in FIG. 5. The cooling wind emitted from battery pack 2b flows through exhaust duct 12 and is exhausted from an exhaust port (not shown) out of the vehicle.

In the cooling structure of FIG. 7, the cooling wind flowing from coolant introducing space 23b into battery pack 2b passes through the gap provided inside module 22 and is forwarded to coolant lead-out space 24b. On this occasion, since component box 3 is in contact with the cooling wind passage via casing 21, the cooling wind introduced into coolant introducing space 23b can cool down not only the battery groups but also component box 3 which is in contact with the cooling wind via casing 21. Accordingly, a cooling fan for cooling DC/DC converter 40 mounted in component box 3 can be eliminated, reducing the number of components in component box 3 to achieve miniaturization and to form thin component box 3.

Further, since component box 3 is placed on the side surface of battery pack 2b in the backward direction of the vehicle, a sufficient space is provided in a portion above battery pack 2b in which cooling fan 4 is not placed, and thus rear seat 5 can be reclined backward to connect the cabin to the luggage space.

Although component box 3 is placed on the side surface of casing 21 for battery pack 2b in the backward direction of the vehicle in FIGS. 5 and 7, the similar effect can also be obtained by placing it on the front side surface of casing 21 for battery pack 2b. In this case, wider luggage space 6 can be provided.

Further, in the power supply unit in accordance with the present embodiment, component box 3 is placed with its center positioned at the central portion of battery pack 2b as in the first embodiment, and thus heat exchange between component box 3 and battery pack 2b due to a difference in temperature is uniformly performed on the plurality of battery groups in module 22, suppressing variations in temperature among the batteries. Therefore, occurrence of variations in characteristics and lives of the batteries can be prevented.

Furthermore, if component box 3 is formed in the shape of a substantially thin flat plate, a reduction in the volume of luggage space 6 resulting from placing component box 3 on the rear side surface of battery pack 2b can be suppressed. Therefore, an accommodation space for a spare tire provided in luggage space 6 will not be affected.

It is to be noted that forming thin component box 3 can be implemented by forming thin circuit components to be accommodated and placing them in a plane, in addition to the elimination of the cooling fan for DC/DC converter 40, as previously described.

As described above, according to the second embodiment of the present invention, a power supply unit compactly accommodating components corresponding to a mounting limitation of a vehicle can be structured, and a need for a higher-voltage battery can also be satisfied.

Further, since the component box is formed in the shape of a substantially flat plate and placed adjacent to the rear side surface or the front side surface of the battery pack, the cabin can be connected to the luggage space, and accommodating capacity can be maintained even with a higher-voltage battery. On this occasion, if the component box is formed in the shape of a substantially thin flat plate, a reduction in the volume of the luggage space can be suppressed.

It is to be noted that, since the component box is placed at the center of the side surface of the battery pack to extend along the direction in which the battery groups are layered as in the first embodiment, variations in characteristics and lives among battery cells can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply unit mountable in a vehicle, comprising:
    a battery pack accommodating a battery module including a plurality of battery cells, said battery module being formed in said battery pack to include a plurality of layered battery groups which include said plurality of battery cells,
    a component box accommodating an electric component electrically connected to said battery module, said component box having a shape of a substantially flat plate, and
    a cooling device for supplying a coolant to said battery module to cool down said battery module,
    wherein said battery pack includes a casing as an exterior material for said battery module,
    said battery pack further includes a coolant passage through which said coolant passes between an outer surface of said battery module and said casing,
    a contacting surface of said component box is placed in substantial contact along the contacting surface with one of longitudinally extending side surfaces of said casing, said side surfaces extending in a direction in which said plurality of layered battery groups are layered among the plurality of side surfaces of said casing, thereby placing said component box in contact with the coolant passage through the contacting surface, and
    said component box is placed with a center thereof positioned at a central portion of said side surface of said casing extending in the direction in which said plurality of layered battery groups are layered, such that heat exchange of increased uniformity over said plurality of layered batteries occurs between said component box and said battery pack through the contacting surface without transfer of any coolant from the cooling device into the component box.

2. The power supply unit according to claim 1, wherein said component box has a shape of a substantially flat plate extending in the direction in which said plurality of layered battery groups are layered.

3. The power supply unit according to claim 2, wherein said component box has a shape of a substantially thin flat plate extending in the direction in which said plurality of layered battery groups are layered.

4. The power supply unit according to claim 1, wherein
    the direction in which said plurality of layered battery groups are layered is substantially vertical to a forward direction of said vehicle, and
    the side surface extending in the direction in which said plurality of layered battery groups are layered has a normal line in one of an upward direction, a downward direction, a forward direction, and a backward direction of said vehicle.

5. The power supply unit according to claim 4, wherein said battery pack is placed in a luggage space behind a seat of said vehicle.

6. The power supply unit according to claim 1, wherein said battery pack further comprises:
    a coolant introducing space for supplying said coolant from said cooling device to said coolant passage; and
    a coolant lead-out space for exhausting said coolant from said coolant passage out of said battery pack.

7. The power supply unit according to claim 6, wherein said cooling device comprises:
    an intake portion for taking in said coolant which has been used for air-conditioning of said vehicle;
    a blower portion for supplying said taken-in coolant to said battery pack; and
    an exhaust portion for exhausting said coolant exhausted from said battery pack out of said vehicle.

* * * * *